(12) United States Patent
Katz

(10) Patent No.: US 6,594,142 B2
(45) Date of Patent: Jul. 15, 2003

(54) FOLDING KEYBOARD FOR A PERSONAL DIGITAL ASSISTANT

(75) Inventor: Michael Katz, Vancouver (CA)

(73) Assignee: Pocketop Computers Corp., Vancouver (CA)

(*) Notice: Subject to any disclaimer, the term of this patent is extended or adjusted under 35 U.S.C. 154(b) by 0 days.

(21) Appl. No.: 09/850,158

(22) Filed: May 8, 2001

(65) Prior Publication Data

US 2002/0030965 A1 Mar. 14, 2002

Related U.S. Application Data

(60) Provisional application No. 60/219,125, filed on Jul. 19, 2000.

(51) Int. Cl.[7] .............................................. H05K 17/94
(52) U.S. Cl. ................... 361/680; 361/686; 400/472; 341/22
(58) Field of Search .......................... 361/680, 681–686; 400/82, 472, 489; 200/343; 341/42, 22

(56) References Cited

U.S. PATENT DOCUMENTS

| | | | |
|---|---|---|---|
| 5,251,163 A | 10/1993 | Rouhani | 364/709.12 |
| 5,872,557 A | * 2/1999 | Wiemer et al. | 361/683 |
| 5,941,648 A | * 8/1999 | Robinson et al. | 400/82 |
| 6,081,207 A | * 6/2000 | Batio | 361/680 |

FOREIGN PATENT DOCUMENTS

| | | |
|---|---|---|
| DE | 195 02 704 A1 | 1/1995 |
| EP | 0 640 489 A2 | 9/1993 |

* cited by examiner

*Primary Examiner*—Darren Schuberg
*Assistant Examiner*—Hung Van Duong
(74) *Attorney, Agent, or Firm*—Oyen Wiggs Green & Mutala

(57) ABSTRACT

Prior collapsible keyboards for personal digital assistants are overly complex and large. The present invention provides a folding keyboard for a personal digital assistant which folds up simply and in a small size and which is useful for standard typists. It is divided into two halves hingedly connected along a fold line. While the central or home row keys are standard size, the other two rows of keys are of reduced transverse dimension and are preferably so shaped as to allow a touch typist to use existing movements without missing the keys of reduced size.

26 Claims, 5 Drawing Sheets

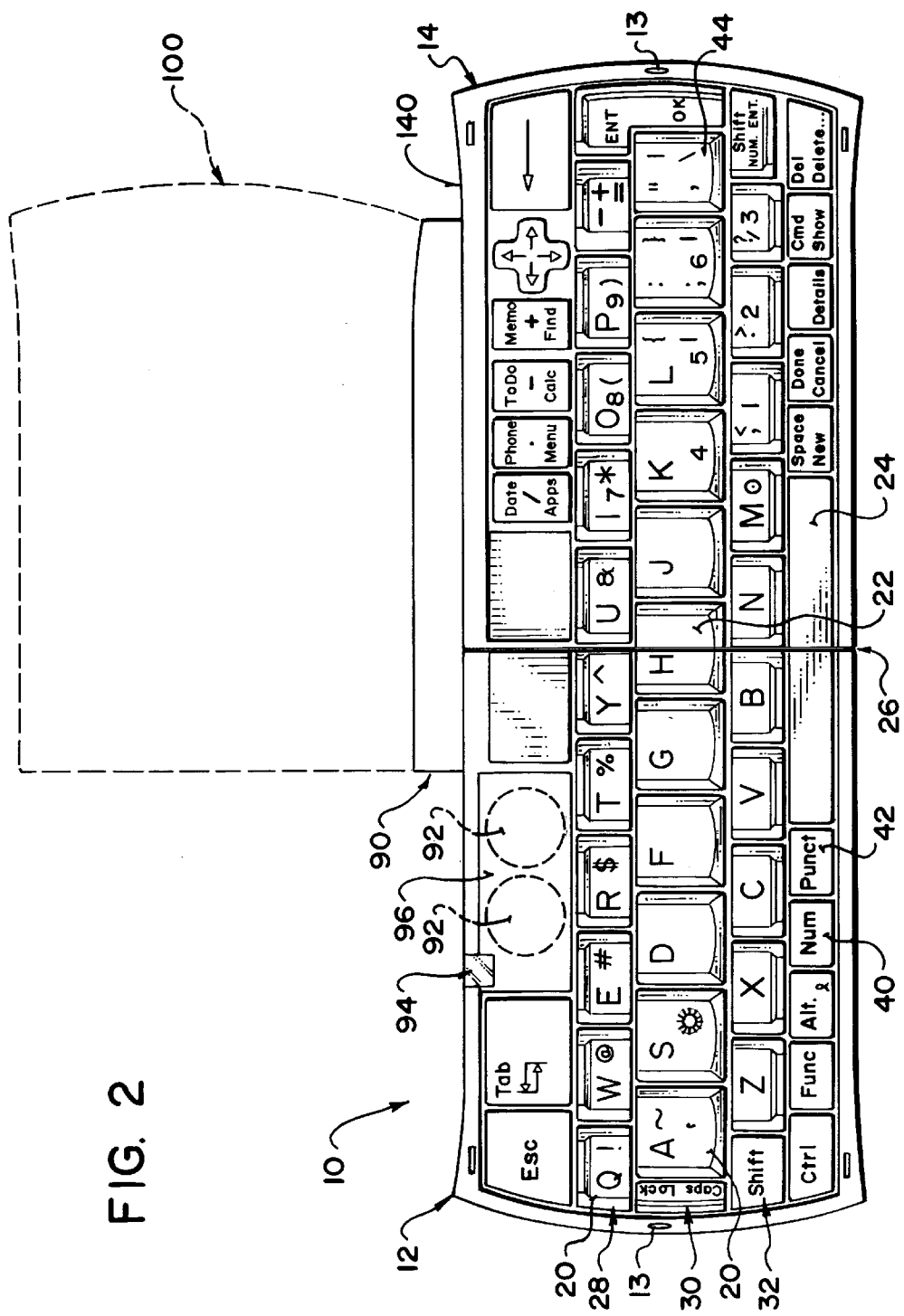

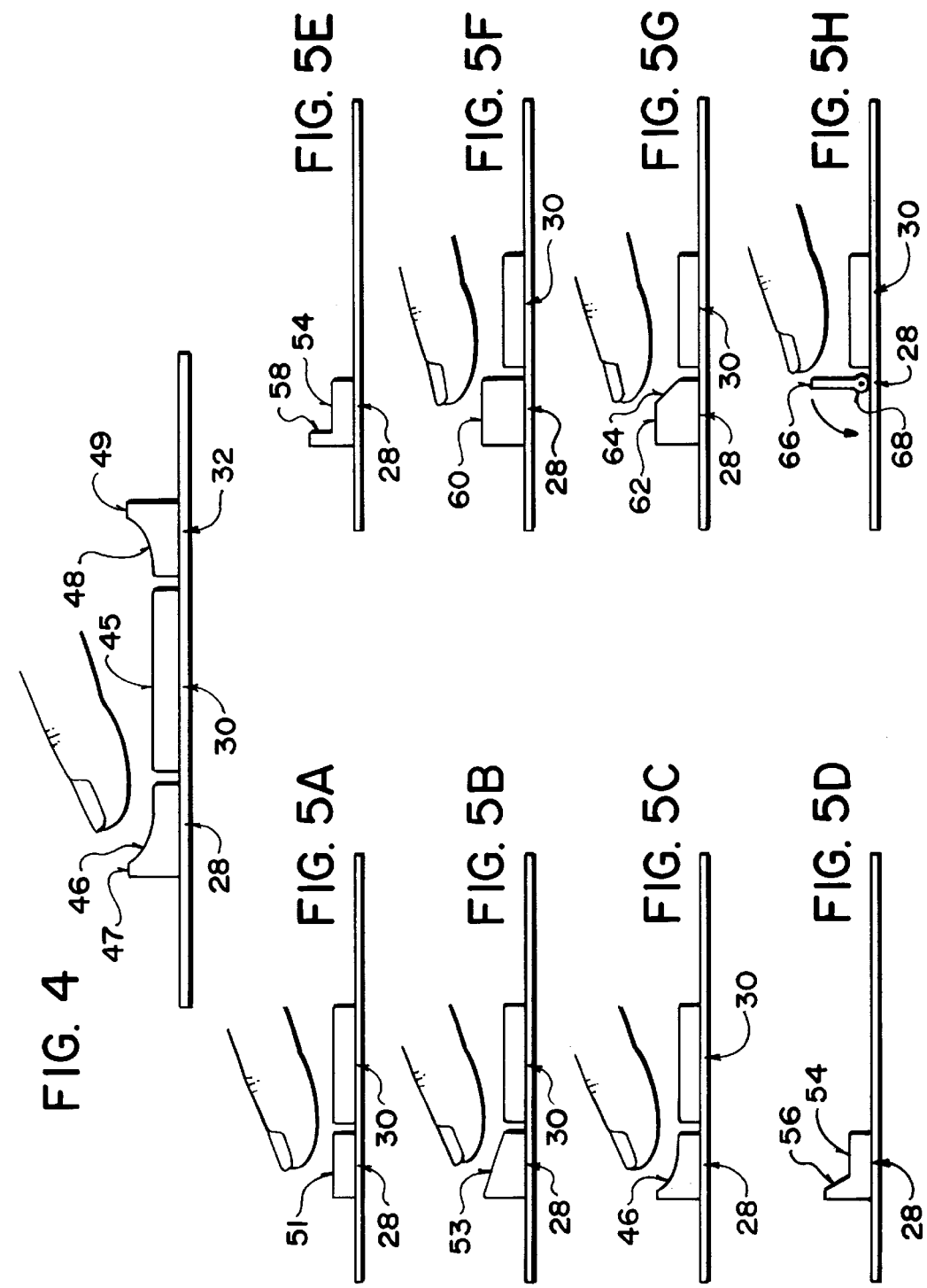

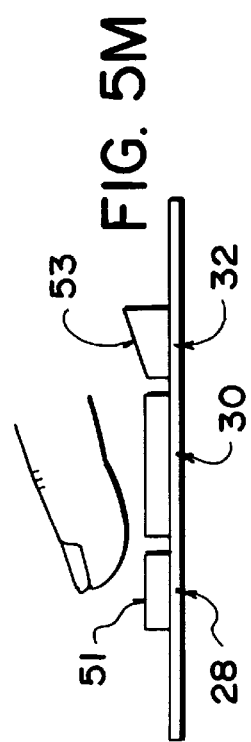
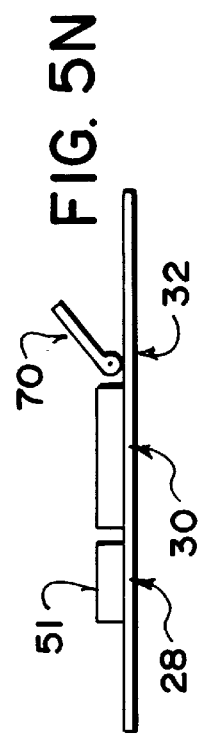
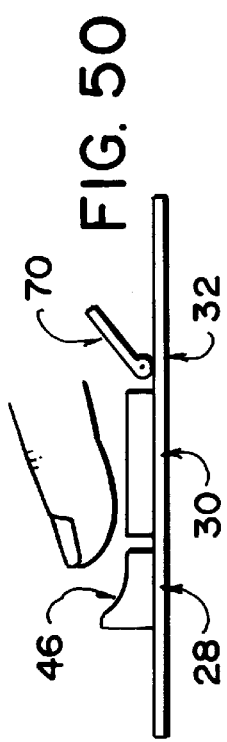
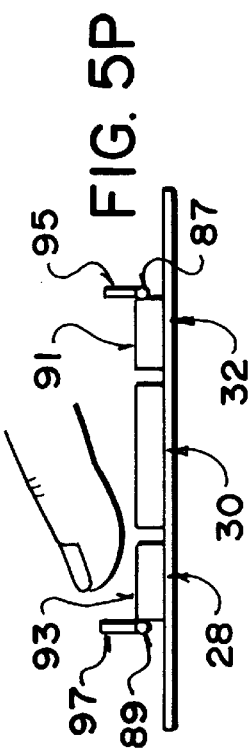
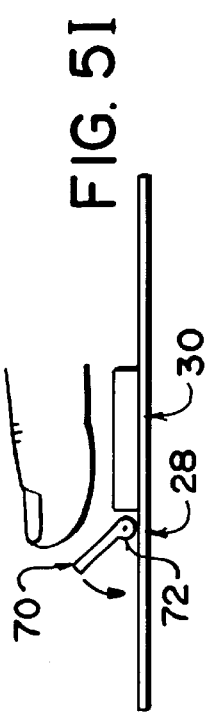
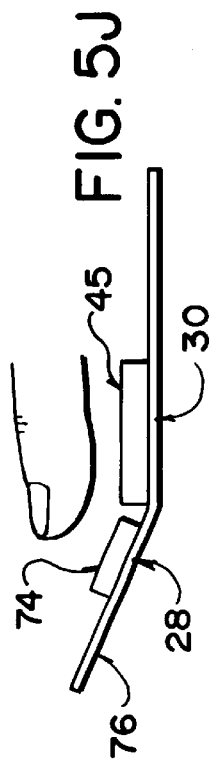
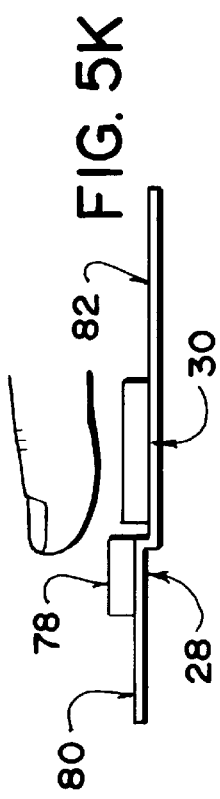
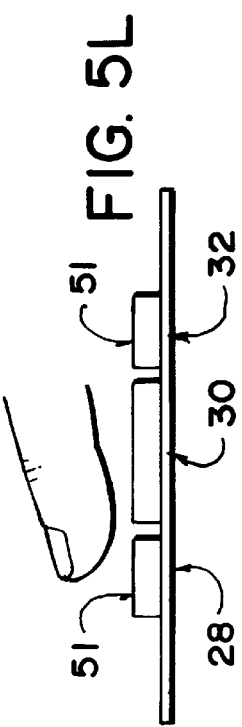

FOLDING KEYBOARD FOR A PERSONAL DIGITAL ASSISTANT

CROSS-REFERENCE TO RELATED APPLICATION

This application claims the benefit under 35 USC 119(e) of U.S. Provisional Patent Application No. 60/219,125 filed Jul. 19, 2000.

TECHNICAL FIELD

The invention relates to folding keyboards, and in particular to a folding keyboard particularly useful for use with a personal digital assistant.

BACKGROUND ART

Personal digital assistants ("PDA's"), such as the devices manufactured by PALM™ and HANDSPRING™, are popular both as portable computers and as wireless communication devices. These devices use a pen to either hand-write characters or select letters from a simulated keyboard. However the lack of a standard keyboard greatly reduces the usefulness of these devices for word processing, e-mail, internet access or software applications. Touch typists require a standard size keyboard to type at full speed and efficiency. This requires a standard key size of about 18 mm square, with a 1 mm spacing between keys. Thus a standard size keyboard cannot be reduced to a size comparable to the size of a PDA without folding and/or collapsing the keyboard.

A collapsible full-size keyboard has been developed for PDA's and similar devices. See for example U.S. Pat. No. 6,174,097 issued Jan. 16, 2001 to Simon entitled "Collapsible Keyboard", which keyboard is sold under the trademark STOWAWAY by Think Outside, Inc. While such a device provides a collapsible full-size keyboard for a PDA, it is complex to manufacture due to the need for three folding axes and multiple slidable keys and spring connections to effect collapsing. It is also larger than the PDA when collapsed. Before one can use the STOWAWAY keyboard, a driver program must be installed on the PDA. To connect the PDA with the STOWAWAY keyboard, a popup stand to support the PDA is provided on the keyboard. The connector of the PDA is slid onto a corresponding connector on the keyboard.

The present inventor has invented a folding keyboard which allows a full-size keyboard to be folded using a split key, as disclosed in U.S. Pat. No. 6,088,220 issued Jul. 11, 2000. However such a keyboard, while useful for a pocket-sized computer is also greater in size than a PDA when folded.

The present inventor has also invented a combination mobile telephone, personal digital assistant and computer, as disclosed in provisional application No. 60/219,125 filed Jul. 19, 2000 which comprises a computer keyboard comprising a plurality of keys generally corresponding to the keys of a standard personal computer keyboard, and comprising two halves hingedly connected along a fold line extending transversely across the keyboard, each half thereby comprising a portion of the plurality of keys, whereby the computer is folded from a first open position in which the plurality of keys forms the generally standard personal computer keyboard, to a closed position in which the two halves are in opposed parallel relationship whereby the respective portions of the plurality of keys on the respective halves face each other in close proximity or actual contact, and which includes keys which are reduced in size but act like regular sized keys due to the shape of the key surface.

There is therefore a need for a folding keyboard for use with PDA's which functions as a full-size keyboard and which folds in a simple manner to the size of a PDA.

DISCLOSURE OF INVENTION

The present invention provides a folding keyboard comprising a plurality of keys generally corresponding to the keys of a standard personal computer keyboard comprising three parallel, lengthwise rows of keys comprising a central row, an upper row and a lower row, and comprising two halves hingedly connected along a fold line extending transversely across said keyboard perpendicular to the direction of the rows, each half thereby comprising a portion of said plurality of keys, whereby the keyboard is folded from a first open position in which the plurality of keys forms a generally standard personal computer keyboard, to a closed position in which the two halves are in opposed parallel relationship; and wherein the central row comprises keys of standard size, and the upper and lower rows comprise keys which are reduced in size in the transverse direction. Preferably the surfaces of the upper and lower rows of keys are configured to redirect a typist's finger to the center of the reduced size key.

BRIEF DESCRIPTION OF DRAWINGS

In drawings which disclose a preferred embodiment of the invention:

FIG. 2 is a top view of the invention, in open position, with an attached PDA shown in phantom outline;

FIG. 4 is a side view of the key structure for the first and third rows of keys;

FIGS. 5a to 5p are side views, not to scale, of variants of the key structure for the first and third rows of keys.

BEST MODE(S) FOR CARRYING OUT THE INVENTION

Figure 1:
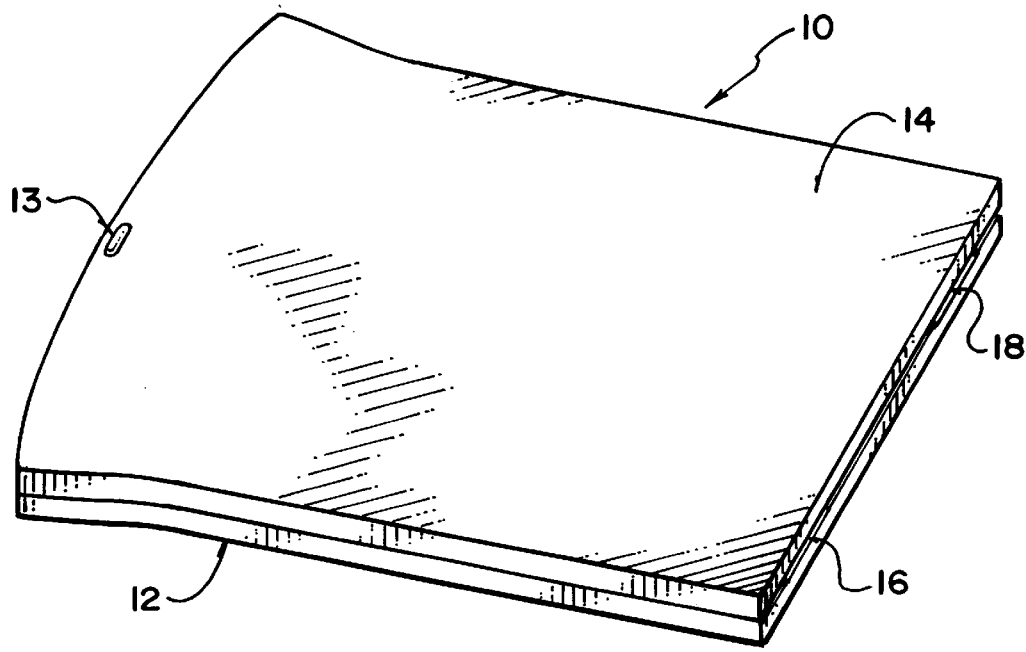
FIG. 1 is a perspective view of the invention, fully folded.

With reference to the drawings, a folding keyboard, shown fully folded in FIG. 1, is designated generally as 10. It comprises keyboard halves 12, 14. The keyboard is hinged at hinges 16, 18 so that the keyboard halves 12, 14 can be folded as shown in FIG. 1. The preferred dimensions for keyboard 10 are such that the fully folded dimensions are approximately the same as the dimensions of a PDA: namely 4.5 inches in length and 3 inches in width. The thickness is approximately 0.44 inches. When fully unfolded as shown in FIG. 2, keyboard 10, composed of keyboard halves 12, 14 and an array of keys 20 acts as the PDA data input. At least one of the keys 20, typically the "H" key 22 and the space bar 24, may be split along the fold line to permit folding of the keyboard as disclosed in the same inventor's U.S. Pat. No. 6,088,220. Keyboard 10 has three rows 28, 30, 32 of letter keys. The keys in the center or "home" row 30 (ASDFGHJKL;') are standard size, about 18 mm square and spaced at the normal spacing of a standard QWERTY keyboard, and 19 mm measured center to center horizontally (that is, in the direction parallel to the length of the center row). The top row 28 (QWERTYUIOP[ ]) and bottom row 32 (ZXCVBNM,./) are standard horizontal dimensions but are only about 50% of the vertical dimension, namely about 9 mm. Function keys 40, 42 are provided so that certain keys such as 44 can also be used to type numbers and additional punctuation symbols. For example to type the numeral "4", the user depresses function key 40 and letter key "K". To type the punctuation sign "{", the user depresses function key 42, the "shift" key and letter key "L".

In order to facilitate a typist utilizing the same finger action as that employed on a standard full-size QWERTY keyboard, the top and bottom rows of keys 28, 32 preferably have a scalloped or contoured upper surface 46, 48 (see FIG. 4) whereby the upper edge 47 of keys in row 28 and the lower edge 49 of keys in row 32 is raised above the surface 45 of center row 30. Thus, when a typist types on keyboard 10 he/she will use the same finger action as for a standard keyboard, but to prevent the typist from missing the upper and lower keys, the upper surfaces of the top and bottom rows 28, 32 are shaped to prevent the fingers from overrunning the keys by curving the upper or lower edges of the keys in the top and bottom rows upwardly. To be useful, it has been found that the height of upper edges 47 and 49 should be approximately 1.5 mm. higher than the surface 45 of row 30.

Further embodiments of the configuration of the keys for the top and bottom rows 28, 32 are shown in FIGS. 5a through 5p. In the embodiment shown in FIG. 5a, the tops 51 of the half-keys in row 28 are flat. In this case, the typist can still strike the half keys as if they are full size without missing the key entirely, although it is preferable to have a configuration to the key which assists in directing the typist's finger to the key. In the embodiment shown in FIG. 5b, the top surface 53 of the key in row 28 slopes uniformly upwardly rather than having a curved or scalloped upper surface as in FIGS. 4 and 5c. Further variants of the scalloped key are shown in FIGS. 5d and 5e, wherein the upper surface of the key, rather than being smoothly curved, has a horizontal portion 54 adjacent to an angled surface 56 or vertical surface 58 (the vertical scale of FIG. 5e is exaggerated for illustrative purposes, but there should be a height of surface 58 of 1.5 mm, and it could be hinged as discussed below concerning FIG. 5p). In the embodiment shown in FIG. 5f, the keys in row 28 are thicker than those in home row 30 so the top surface 60 of the keys in row 28 is raised above center row 30 but is horizontal or flat. In the embodiment shown in FIG. 5g, the top surface 62 of the keys in row 28 is raised above center row 30 and is horizontal for part of the surface but angled on the face 64 adjacent the center or home row.

In the embodiment shown in FIG. 5h, the keys in row 28 are configured as hinged vertical tabs 66 which pivot about hinge 68, and cause the key to be struck when pivoted a certain amount from vertical. In the embodiment shown in FIG. 5i, the keys in row 28 are also configured as hinged tabs 70 which pivot about hinge 72, but when in the rest position are angled rather than vertical. The key is caused to be struck when pivoted a certain amount from the rest angle. In the embodiment shown in FIG. 5j, the keys in row 28 have a flat upper surface 74 and are the same thickness as the keys in row 30, as in FIG. 5a, but the underlying support surface 76 is angled, causing surface 74 to be angled in relation to the upper surface 45 of the keys in row 30. In the embodiment shown in FIG. 5k, the keys in row 28 have a flat upper surface 78 and are the same thickness as the keys in row 30, as in FIG. 5a, but the underlying support surface 80 is raised above the underlying support surface 82 of center row 30, causing surface 78 to be higher than the upper surface of the keys in row 30.

As shown in FIGS. 5l through 5o, the lower row 32 can have the same key configuration as upper row 28 (FIGS. 4, 5l) or a combination of different key configurations as described above. For example, the keys in FIG. 5o have the scalloped upper surface 46 of FIG. 5c for top row 28 and the angled pivotting tab 70 of FIG. 5i for row 32. To minimize the thickness of the keyboard when folded, the scalloped key itself may be formed of two parts, as shown in FIG. 5p. In this embodiment, top row keys 28 and/or bottom row keys 32 are formed of a flat key 91, 93 to which is attached a hinged vertical tab 95, 97 connected by hinges 87, 89 to keys 91, 93. Hinges 87, 89 are stiff enough to permit the tabs 95, 97 to redirect the typists fingers when the keyboard is unfolded, but allow the tabs to be folded either on top of keys 91, 93 or in the direction above or below rows 28, 32 when the keyboard is folded. The direction of folding of tabs 95, 97 is determined by causing the rest position of the tabs to be slightly off vertical in the chosen direction of folding.

Figure 3:
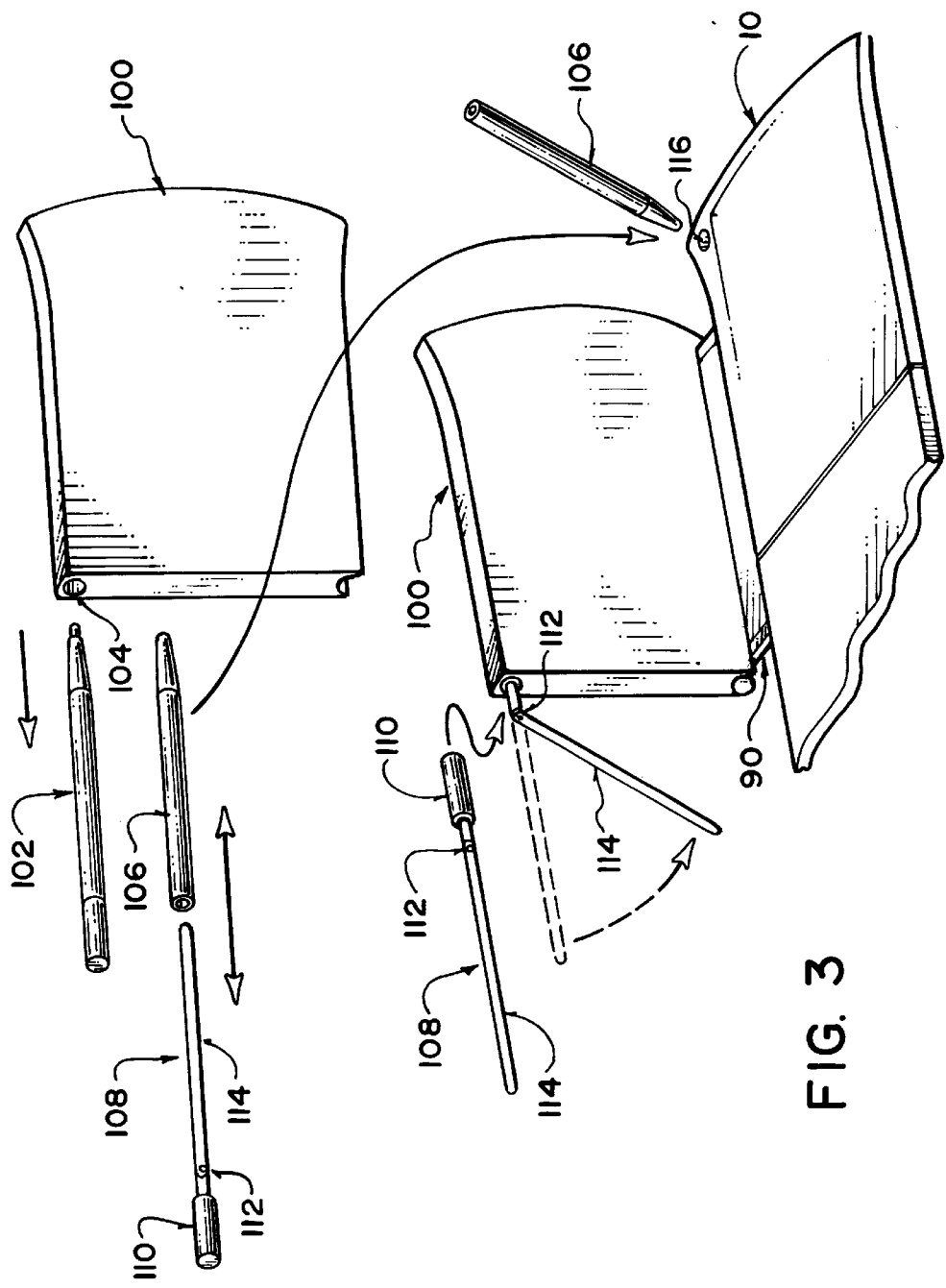
FIG. 3 is a perspective view of the invention, fully open in which a novel pen is used as a stand for the PDA.

Keyboard 10 can be connected to PDA 100 either by a direct plug-in connection or by infrared (IR) communication. If infrared connection is utilized, the PDA 100 is connected to the keyboard 10 by hinge 90 as shown in FIG. 2 and as further described below. In that case, the screen display on the PDA is rotated 90 degrees, using HACKMASTER™ or other available software. Electrical power is provided by batteries 92. The infrared port from the keyboard is provided at 94 and is directed so that it communicates with the infrared port of the PDA when the PDA is connected to the keyboard as shown in FIGS. 2 and 3. Suitable software is either loaded on the PDA to process the infrared keyboard signals either through a personal computer or directly from the keyboard 10. If a direct plug-in connection is used, then a compatible plug-in connection is provided at 96 rather than an IR port and the PDA connector is plugged in in the normal orientation as in the existing STOWAWAY keyboard.

When an IR connection is provided, pen or stylus 102 of the PDA 100 (FIG. 3), which is stored in cavity 104 can also be used to provide a stand for the PDA 100 to form a configuration like a laptop computer in conjunction with the keyboard as shown in FIG. 3. The stylus 102 has an outer shell 106 and an inner element 108 consisting of a cylinder 110 connected by a hinge 112 to leg 114. Stylus 102 is removed from cavity 104 and outer shell 106 is removed and can be held for storage in a rubber cup 116 provided in keyboard 10. Cylinder 110 is inserted into cavity 104 and leg 114 is pivoted to the appropriate angle about hinge 112 to act as a support for the PDA. Hinge 112 is sufficiently tight so that the leg 114 will stay in a given position once pivoted or twisted into that position.

Figure 6:
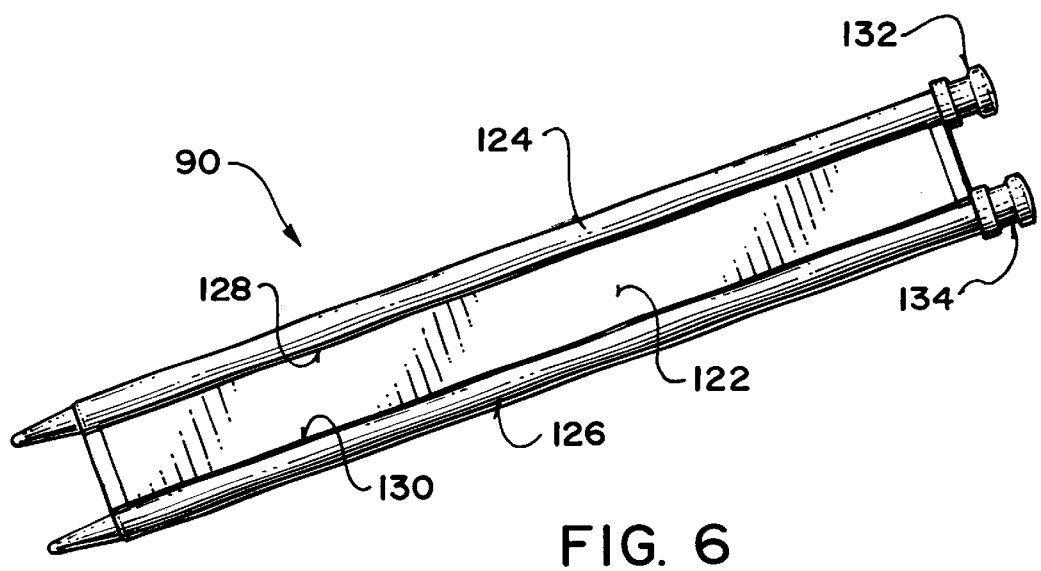
FIG. 6 is a detail perspective view of the hinge construction.

Hinge 90, shown in FIG. 2 and in more detail in FIG. 6, serves to attach the PDA 100 to the keyboard 10. The keyboard 10 is also locked in the open position by sliding hinge 90 to the position shown in FIG. 2. Hinge 90 has a central panel 122 which connects stylus-shaped rods 124, 126 by hinge joints 128, 130. Stylus-shaped rods 124, 126 are sized and shaped as a PDA stylus to fit into the stylus cavity 104 in a PDA. As in the PDA stylus, stylus-shaped rods 124, 126 have heads 132, 134 with a cammed shape to allow the stylus to be tightened into a secure fit in cavity 104. To connect the PDA 100 to the keyboard 10 as in FIG. 2, one of the rods 124 is slid into cavity 104 of PDA 100. The other rod 126 is slid into a similar cavity 140 along the edge of keyboard 10. Hinge 90 is sized so that it can be left in cavity 140 when keyboard 10 is folded by sliding it to the right in FIG. 2. When the keyboard is unfolded hinge 90 is slid to the position shown in FIG. 2 which locks the keyboard in the open position.

To minimize the thickness of the keyboard 10 when folded, the keys 20 are compressed or squeezed to their maximum depression and minimum height between halves 12 and 14 through contact with the keys on the opposing half, and a snap or clasp 13 (FIGS. 1 and 2) locks the halves in the closed configuration until released.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A folding keyboard comprising a plurality of keys generally corresponding to the keys of a standard personal computer keyboard comprising three parallel, lengthwise rows of keys forming a central row, an upper row and a lower row, and comprising two halves hingedly connected along a fold line extending transversely across said keyboard, each half thereby comprising a portion of said plurality of keys, whereby said keyboard is folded from a first open position in which said plurality of keys forms said generally standard personal computer keyboard, to a closed position in which said two halves are in opposed parallel relationship and wherein said central row comprises keys of standard size, and said upper and lower rows comprise keys which are reduced in size in the transverse direction.

2. The folding keyboard of claim 1 wherein said reduced size keys comprise keys which are less than 75% of the standard dimension in the transverse dimension.

3. The folding keyboard of claim 1 wherein said reduced size keys comprise keys which are less than 50% of the standard dimension in the transverse dimension.

4. The folding keyboard of claim 1 wherein said reduced size keys comprise keys which have upstanding edges along the top and bottom edges thereof respectively which are raised above the upper surface of said central row.

5. The folding keyboard of claim 1 wherein said reduced size keys comprise keys which have upper horizontal surface portions which are raised above said central row.

6. The folding keyboard of claim 1 further comprising means for electrically connecting a personal digital assistant.

7. The folding keyboard of claim 1 further comprising infrared means for communicating with a personal digital assistant.

8. The folding keyboard of claim 1 wherein at least one of said keys is split along said fold line to permit folding of said keyboard.

9. The folding keyboard of claim 1 further comprising hinge means for hingedly attaching a personal digital assistant.

10. The folding keyboard of claim 1 wherein said reduced size keys comprise keys which are configured to redirect a finger of a typist to the surface of the key.

11. The folding keyboard of claim 1 wherein said reduced size keys comprise keys which have an upper surface a portion of which slopes upwardly away from said center row.

12. The folding keyboard of claim 1 wherein said reduced size keys comprise keys which comprise vertically extending hinged tabs.

13. The folding keyboard of claim 1 wherein said reduced size keys comprise keys which comprise a horizontal surface hingedly connected to a vertically extending hinged tab.

14. The folding keyboard of claim 1 wherein the keys in the top and bottom row have upper surfaces which are configured to reduce the likelihood of a typists' fingers overrunning the keys.

15. The folding keyboard of claim 4 wherein said reduced size keys comprise keys which have a curved upper surface.

16. The folding keyboard of claim 4 wherein said reduced size keys comprise keys which have a uniformly sloping upper surface.

17. The folding keyboard of claim 4 wherein said reduced size keys comprise keys which have an upper surface which forms an angle less than 180 degrees with the plane of said central row.

18. The folding keyboard of claim 9 further comprising means for supporting a personal digital assistant when said personal digital assistant is attached to said folding keyboard.

19. The computer keyboard of claim 14 wherein said keys in the top and bottom row each have a scalloped upper surface.

20. The folding keyboard of claim 17 wherein said means for supporting a personal digital assistant when said personal digital assistant is attached to said folding keyboard comprises a stylus-shaped element having a first end sized to fit in a stylus-receiving cavity of a personal digital assistant, and a rigid elongated element pivotally connected thereto.

21. A computer keyboard, comprising a plurality of keys generally corresponding to the keys of a standard personal computer keyboard, arranged in at least three longitudinal rows, wherein the keys in the central row are of a standard size, and the keys in the top and bottom row are of reduced size and have upper surfaces which are configured to reduce the likelihood of a typists' fingers overrunning the keys.

22. The computer keyboard of claim 21 wherein said upper surfaces of the keys in the top and bottom row have upstanding edges along the top and bottom edges thereof respectively which are raised above the upper surface of said central row.

23. The computer keyboard of claim 21 wherein said keys in the top and bottom row each have a curved upper surface.

24. The computer keyboard of claim 21 wherein said keys in the top and bottom row each have a uniformly sloping upper surface.

25. The computer keyboard of claim 21 wherein said keys in the top and bottom row each have a scalloped upper surface.

26. The computer keyboard of claim 21 wherein said keys in the top and bottom row each have an upper surface which is raised above said upper surface of said central row.

* * * * *